United States Patent [19]

Nakamura et al.

[11] 4,049,439
[45] Sept. 20, 1977

[54] METHOD PRODUCING SLAG BALLAST

[75] Inventors: Kunio Nakamura; Mitsuo Takahashi, both of Himeji, Japan

[73] Assignee: Nippon Steel Corporation, Tokyo, Japan

[21] Appl. No.: 645,291

[22] Filed: Dec. 29, 1975

[30] Foreign Application Priority Data

Dec. 30, 1974 Japan .................. 50-2403

[51] Int. Cl.² ........................... C21B 3/04; C22B 7/04
[52] U.S. Cl. ........................................... 75/24
[58] Field of Search ........................................... 75/24

[56] References Cited

U.S. PATENT DOCUMENTS

| | | | |
|---|---|---|---|
| 3,043,678 | 7/1962 | Lowry | 75/24 |
| 3,751,243 | 8/1973 | McLeod | 75/24 |
| 3,758,292 | 9/1973 | Kuntz | 75/24 |
| 3,761,243 | 9/1973 | Kuntz | 75/24 |
| 3,823,010 | 7/1974 | Tobias | 75/24 |
| 3,941,585 | 3/1976 | Hauser | 75/24 |

*Primary Examiner*—Peter D. Rosenberg
*Attorney, Agent, or Firm*—Wenderoth, Lind & Ponack

[57] ABSTRACT

In producing slag ballast from molten slag obtained from metal smelting processes, molten slag is poured into a revolving cylinder which is supported in an inclined position, and the whole external peripheral surface of which serves as the cooling surface, and the molten slag is cooled at a rate exceeding 20° C/min.

As the molten slag is cooled while it moves forward in the revolving cylinder, it is broken up into medium sized lumps to become slag ballast.

8 Claims, 3 Drawing Figures

METHOD PRODUCING SLAG BALLAST

BACKGROUND OF THE INVENTION

The present invention relates to a convenient method for producing slag ballast having favorable properties from molten slag obtained from blast furnaces and other smelting furnaces.

Molten slag as referred to above should be understood to include those by-products obtained in the metal smelting processes in blast furnaces, open hearth furnaces, converters, and electric furnaces, as well as in the metal melting processes in cupolas and the like. In the following description, molten blast furnace slag will be taken as a representative example and will be simply referred to as slag.

As is well known, in the pig iron production process in blast furnaces, molten slag as hot as 1400°–1500° C is obtained in an amount as much as 300 kg per ton of pig iron. Such molten slag consists primarily of $SiO_2$, $Al_2O_3$, CaO, and MgO as can be seen from the following figures representing an example of the slag composition:

| $SiO_2$ | $AlO_2$ | CaO | MgO | S | MnO | T.Fe | others |
|---|---|---|---|---|---|---|---|
| 35.0 | 15.3 | 42.1 | 5.6 | 0.85 | 0.1 | 0.15 | 0.30 (%) |

Normally, S is present in an amount of 0.8–1.2% in slag.

Recently, serious attempts have been made to find a way of utilizing molten slag. A representative utilization is so-called slag ballast which is obtained by crushing and sieving of slowly cooled and solidified molten slag. Because slag ballast possesses hydraulicity, it is mostly used as the subbase material in road construction.

Conventional processes of obtaining slag ballast normally include (1) pouring of molten slag from blast furnaces into ladle cars, (2) transportation of the molten slag in ladle cars to a cooling yard, (3) pouring the molten slag over a cooling yard, (4) natural cooling of the molten slag for 6 to 8 hours, (5) water cooling of the slag for 3 to 4 hours, (6) recovering the solidified slag by such means as bulldozers, (7) crushing, and (8) sieving.

However, such conventional processes are disadvantageous because (1) a large cooling yard is required to process large amounts of slag, (2) for the air and water cooling of slag, much time is consumed, and (3) much manpower is required to recover the cooled and solidified slag. Furthermore, slag ballast obtained through conventional methods as described above is not very satisfactory as road subbase material because it contains a substantial amount of sulfur.

Of late, a number of improved methods have been proposed to eliminate some of the shortcomings of slag ballast. For example, for the purpose of improving the compressive strength of slag ballast, proposals have been made to reduce the number of holes therein by mixing steel rolling scale, converter slag, and Indian ferromanganese ore into the molten slag. For the purpose of fixing the sulfur contained in slag and preventing it from dissolving in water, proposals have also been made to fix the sulfur in the slag as sulfides of iron or manganese which are not soluble in water by mixing converter slag, steel rolling scale, and Indian ferromanganese ore the molten slag.

However, to produce this improved slag ballast, not only are large yards required, long hours wasted, and much manpower required for recovering the solidified slag, but also for crushing the improved high density and hard slag containing additives such as described above, special crushing devices may be required because such improved slag is too hard to be crushed by conventional crushers. It may be mentioned that while ordinary slag ballast has a compressive strength of 20 to 24 kg/cm², the above described improved slag ballast has a compressive strength of 25 to 35 kg/cm².

On the other hand, in view of the growing general concern with energy saving, efforts are increasingly being made to recover and utilize conventionally wasted energy, but no attempts have been successful so far during recovering the heat of molten slag in the process of producing slag ballast from molten slag. The chief reason for the lack of satisfactory methods of recovering and utilizing heat during conventional slag ballast production processes is that the hot molten slag is very difficult to handle and leaving it to cool by itself has been the only technically feasible method of cooling it.

SUMMARY OF THE INVENTION

A primary object of the present invention is to provide a method by which all the shortcomings as described above involved in conventional slag ballast production processes are eliminated, and slag ballast having favorable properties is conveniently produced in devices that occupy only a small space.

Another object of the present invention is to provide a method by which the heat dissipated from molten slag during the slag ballast production process is effectively recovered, resulting in substantial energy saving.

A further object of the present invention is to provide a ballast slag production method that makes it possible to obtain the produced slag ballast smoothly in lumps of small size.

Further objects of the present invention will be easily understood by those skilled in the art from the following descriptions and attached drawings.

The method of producing slag ballast according to the present invention and achieving all these objects is characterized in that in producing slag ballast from molten slag obtained from a metal smelting process, molten slag is poured into a revolving cylindrical body which is supported in an inclined position, and the whole external peripheral surface of which serves as the cooling surface, and the molten slag is cooled at a rate exceeding 20° C/min.

An apparatus for carrying out the method of the present invention and effectively achieving all the above objects comprises a cylindrical body supported in an inclined position and freely rotatable around its axis, said cylindrical body having a molten slag inlet at its upper end and a ballast exit at its lower end, a driving device for driving said cylindrical body to rotate it around its axis, a molten slag charging device for charging molten slag into said cylindrical body, and a cooling device for cooling the external peripheral surface of said cylindrical body.

DESCRIPTION OF THE PREFERRED EMBODIMENTS

After great amount of research and many experiments, it has been discovered that through the use of a cylindrical revolving body which is supported in an inclined position, and the whole external peripheral surface of which serves as the cooling surface, almost all the shortcomings as described earlier can be eliminated. Inasmuch as in the present invention, molten slag is cooled to the solid state and crushed in a single process, a large slag cooling field is not required, production time is shortened as described in more detail later, the labor involved in crushing is saved, and because the slag is broken up by itself into lumps of appropriate size, as will be described in detail later, suitable for forced cooling, heat is efficiently recovered from the obtained slag ballast. Furthermore, it has been found that when molten slag is poured into said revolving cylindrical body, and the cooling rate of the poured molten slag before its solidification is controlled within specific values, slag ballast having properties equal to or better than those of conventional slag ballast is obtained.

The present invention will now be described in concrete detail.

In the slag ballast production process based on the present invention, a revolving cylindrical body which is supported in an inclined position, and the whole external peripheral surface of which is utilized as the cooling surface is employed. When molten slag is poured into such a cylindrical body through its upper end, and the external peripheral surface (cooling surface) of this cylindrical body is cooled for example by water, the molten slag adheres to the inner wall of the revolving cylindrical body and is lifted along the cylindrical wall as the wall continues to revolve. Then when the vertical component of the gravity force working on the rising solidifying slag exceeds the adhesive force and the deflective strength of the portion of the rising solidifying slag, this portion is broken away and drops by its own weight. The broken portion is further broken up as it drops. In this way, as the cylindrical body keeps on revolving around its axis, the solidifying slag in it keeps on rising and falling and being broken, and at the same time, since the cylindrical body is supported in an inclined position, the broken solidifying slag lumps are caused to move smoothly towards the lower end, as they are continuously cooled, until at last, they are discharged from the lower end. In the upper half portion of the revolving cylindrical body, where slag is made to revolve with the cylindrical body in a partly solidified condition, a revolving dam is formed by the continuously poured molten slag and the slag falling due to the effect of gravity, and the whole dam keeps moving towards the lower end. In the lower half portion of the revolving cylindrical body, this revolving and travelling dam of partly solidified slag is broken up into smaller lumps through falling and colliding, and keeps on travelling towards the lower end, all the time dissipating heat, until slag comes out of the lower end opening in the form of slag ballast.

Therefore, when molten slag is treated in such a revolving cylindrical body, cooling yards for molten slag and crushing of solidified slag are completely or nearly completely eliminated, and process time is drastically reduced. However, if this process is performed without appropriate control, the process can become nothing but a new slag disposal process, and unsatisfactory slag ballast is obtained.

Figure 1:
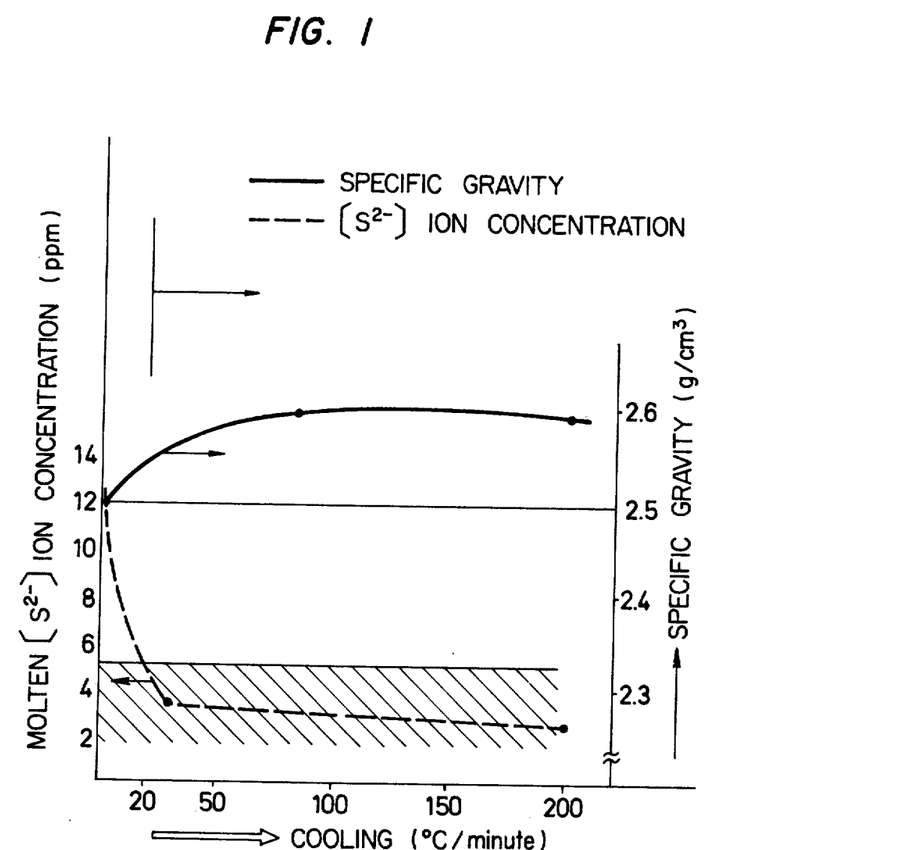
FIG. 1 is a diagram showing the relation between the cooling rate of molten slag in a revolving cylindrical body and the characteristics of the slag ballast obtained.

After extensive experiments and research, directed toward finding conditions for enabling the above-described objects to be achieved, it has been discovered that when the molten slag is cooled until its solidification in the revolving cylindrical body at a cooling rate in excess of 20° C/min and this cooling rate is maintained, slag ballast having favorable properties is obtained. This is seen from the relation between the cooling rate of molten slag in the revolving cylindrical body and the properties of the resulting slag ballast as shown in FIG. 1. In the case of FIG. 1, molten slag is poured into a revolving cylindrical body at 1400° to 1500° C, and solidifies at 1250° to 1300° C.

As can be seen in FIG. 1, when slag ballast is produced at a cooling rate in excess of 20° C/min in a revolving cylindrical body, the cold water extracted $S^{2-}$ ion concentration is very low. Furthermore, it was found that the slag ballast obtained by this method at this cooling rate had properties such as specific gravity, water absorption rate, moisture content, and bulk specific gravity, which are recognized as criteria of ballast quality, fully comparable with those of slag ballast obtained by conventional methods. In FIG. 1, as an example, in addition to $S^{2-}$ ion concentration in cold extraction water, the specific gravity of slag ballast is shown. The cold water extraction process adopted here and the results of which are shown in FIG. 1 consists of leaving one weight unit of slag ballast in 10 weight units of water at normal temperature for a specific time such as 72 hours then determining the $S^{2-}$ ion concentration in this water. On the other hand, as to the upper limit of the cooling rate of molten slag in revolving cylindrical bodies before solidification, no theoretical value was obtained, but if too large a cooling rate is adopted for a revolving cylindrical body of a given size, the travelling speed of the molten slag in the revolving cylindrical body will be slowed accordingly, and also a smaller molten ballast feed rate must be adopted, so that the slag ballast production rate is decreased accordingly. The practical upper limit at which slag ballast is produced at an economically allowable rate is approximately 200° C/min.

Therefore, in the light of the foregoing, in the present invention, a cooling rate of 20° C/min or above is specified for the molten slag until its solidification in a revolving cylindrical body, and the object of obtaining slag ballast of properties comparable with those of conventionally produced slag ballast, as well as a very low sulfur cold water extraction rate, is achieved. The solidification of molten slag as referred to in the present invention means the total solidification of a body of molten slag, as well as a solidification condition in which on the inside of a body of slag a small amount of molten slag still remains.

In this way, according to the present invention, molten blast furnace slag containing 0.8 to 1.2% of S is poured into a revolving cylindrical body, and the molten slag is made to cool until it achieves solidification at a rate exceeding 20° C/min, to obtain slag ballast, which when subjected to a cold water extraction treatment as described above, produces a $S^{2-}$ ion concentration not exceeding 5 ppm. This is in striking contrast to the $S^{2-}$ ion concentration of conventionally produced slag ballast tested by the same extraction process, which is, as shown in Table 8, set forth hereinbelow, is around 12 ppm.

As described above, according to the present invention, molten slag is poured into a revolving cylindrical body, which is supported in an inclined position, and the whole external peripheral surface of which serves as the cooling surface, through its upper end, and the molten slag is cooled until it achieves solidification at a rate in excess of 20° C/min, and when it has become solidified it is broken up, and slag ballast having favorable properties is obtained. Before its actual utilization, the thus obtained slag ballast is further cooled and treated to obtain ballast having any desired grain size distribution.

Now, a preferred embodiment of the present invention will be described.

Although in the slag ballast production method according to the present invention, as described hereinabove, molten slag is poured through the upper opening into a revolving cylindrical body which is supported in an inclined position, and the whole external peripheral surface of which serves as the cooling surface, and is cooled until solidification at a rate in excess of 20° C/min, and as it is solidified, it is broken up and becomes slag ballast having favorable properties, this slag ballast in the as produced state is still too coarse to be immediately used as industrial products such as ballast usable for building roads. Before becoming usable as industrial products, the as-produced slag ballast must be still further crushed.

Further experiments were made to find out those conditions of the slag breaking within the revolving cylindrical body which result in slag ballast of optimum lump size most favorable for said further crushing operation, and as the result of these experiments, it was discovered that when the filling ratio, as defined hereinafter, for supplying molten slag into the revolving cylindrical body was controlled and maintained at 10% or above, the above purpose was almost entirely achieved. When the filling ratio for supplying molten slag into the revolving cylindrical body is controlled so as to be above 10% in the slag ballast production process according to the present invention, the mean grain size of the thus obtained ballast is satisfactorily small, so that any further crushing operations are easy, but when the filling ratio falls below 10%, the slag momentum, particularly the falling momentum, becomes extremely small, so that the solidified slag is broken into large and flat lumps, which are difficult to crush into required sizes in the succeeding crushing operation.

Therefore, a more advantageous embodiment of the present invention is one in which in a revolving cylindrical body which is supported in an inclined position, and the whole external peripheral surface of which serves as the cooling surface, molten slag is poured through the upper opening at such a rate that the filling ratio throughout the process is maintained at a level above 10%, and the cooling rate of the molten slag in the revolving cylindrical body before its solidification is controlled so as to be at a rate above 20° C/min. After being produced by this process, the obtained slag ballast is cooled as necessary, and sieved to separate lumps requiring further crushing from directly usable smaller lumps.

Although no upper limit has been found for the slag filling ratio for the revolving cylindrical body, judging by common sense, to be able to secure sufficient momentum, slag can not occupy more than 50% of the space within the revolving cylindrical body.

In a revolving cylindrical body, generally, the filling ratio of slag is calculated by the following formula, so that it may be controlled on the basis of this formula.

$$\text{Filling ratio } \eta = \frac{K \cdot \sqrt{\beta} \cdot Q}{p \cdot A \cdot D \cdot S \cdot N} \times 100$$

where $p$ = bulk specific gravity of slag at a temperature below 1000° C (t/m$^3$)
$A$ = cross sectional area of the revolving cylindrical body (m$^2$)
$D$ = diameter of the revolving cylindrical body (m)
$S$ = angle of inclination of the revolving cylindrical body (degrees)
$N$ = rotating speed of the revolving cylindrical body (rpm)
$K$ = constant
$\beta$ = angle of repose of slag in the revolving cylindrical body (degree)
$Q$ = pouring rate of molten slag into the revolving cylindrical body (t/h)

In the above formula, the angle of inclination of the revolving cylindrical body should preferably be selected to be within the range between 2° and 10°, for the following reason.

When the revolving cylindrical body is supported at an angle steeper than 10°, the introduced molten slag flows too fast through the revolving cylindrical body so that its cooling rate cannot be maintained very well at a level above 20° C/min, except when a very long revolving cylindrical body is used, which is an obvious economical disadvantage requiring investment of extra capital.

On the other hand, when the revolving cylindrical body is supported at an angle smaller than 2°, the molten slag travels towards the lower end too slowly to allow proper operation.

In the preferred embodiment of the present invention, as described above, molten slag is poured into a revolving cylindrical body which is supported in an inclined position, and the whole external peripheral surface of which is made to serve as the cooling surface, through its upper opening at such a rate that the filling ratio throughout the process is maintained at a level above 10%, and the cooling rate of the molten slag in the revolving cylindrical body before its solidification is controlled at a level above 20° C/min, so that slag ballast which not only possesses favorable properties but also has a small mean grain size and can be easily crushed in a succeeding crushing operation is obtained.

It should be understood that in the present invention, the revolving cylindrical body may be cooled by any method and the cooling rate may be controlled by any suitable method. Most conveniently, the cooling rate may be controlled by changes in the cooling conditions of the cooling surface, changes in the revolving speed of the cylindrical body, and changes in the pouring rate of the molten slag.

The reason why the solidified slag which is improved by the addition of various additives so that it is extremely hard in its fully cooled state is broken rather easily within the revolving cylindrical body is that because while in the revolving cylindrical body, the solidified slag is at temperatures at which the slag is low in strength. Because the slag which contains some improving additives is in a semi-solifidied state a temperature above 1100° K, it is easily broken by the force due to a slight fall, having a strength between 1 and 5 kg/cm² above 800° C, so that the larger pieces are effectively broken up.

However, sometimes, in producing slag ballast from molten slag according to the method of the present invention, with or without the quality improving additives as mentioned above, a shortcoming as described below may occur. When molten slag is poured into a revolving cylindrical body, the molten slag adheres to the internal wall of the revolving cylindrical body, solidifies on the wall surface, revolves with the wall, but does not drop from time to time, so that a ring of slag is formed inside the revolving cylindrical body, and this ring of slag extends towards the lower end of the revolving cylindrical body. When this happens, this adhering ring of slag prevents the effective cooling of subsequently poured improved slag by the cooling water poured over the outside of the revolving cylindrical body, so that the slag is not properly cooled nor broken up, and therefore, slag ballast is not produced properly.

After a number of experiments, it has been discovered that when converter slag, rolling scale, Indian ferromanganese ore, or blast furnace slag is introduced into the revolving cylindrical body in the form of powder together with the molten slag, the above shortcoming has been eliminated.

When these powder materials are added in the revolving cylindrical body, not only does the molten slag start to solidify earlier, but also, because the slag is made to move with the wall earlier, it is prevented from adhering to the whole internal peripheral surface of the revolving cylindrical body.

This favorable change is thought to be due to the fact that the powder materials introduced into the revolving cylindrical body form a nucleus of cooling for the molten slag, and thereby cause the partly solidified slag to break up easily.

Furthermore, if these powder materials are introduced into the revolving cylindrical body in an appropriate manner, possibly between the slag and the internal wall of the revolving cylindrical body, they act as parting agents for the slag, assisting its removal from the internal wall of the cylindrical body.

Of the powder materials described above, converter slag, rolling scale, and Indian ferromanganese ore are also effective, as stated earlier, as quality improving additives. However, when powdered blast furnace slag is introduced into the revolving cylindrical body together with molten slag, no appreciable quality improving effect is obtained.

The powder materials described above can be added one kind at a time, or two or more kinds together.

When these powder materials are introduced into the revolving cylindrical body together with molten slag, a further favorable effect of making the lump size of slag ballast still smaller is obtained. Finer lump sizes are desirable because the succeeding crushing process is made easier.

As described above, molten slag obtained from blast furnaces is cooled, solifified, and broken up according to the present invention in a short time, and is discharged out of the revolving cylindrical body in relatively small lumps, which are suitable for an efficient forced cooling process to be subsequently performed on the lumps of slag in a heat exchange tower by contact with air or other gas introduced into the tower.

Furthermore, because the principal requirement of the present invention is to cool the molten slag introduced into a revolving cylindrical body at a rate in excess of 20° C/min until its solidification, the time of discharge from said revolving cylindrical body after its solidification has no substantial effect on the object of the invention which is to obtain slag ballast having favorable properties. Therefore, when the recovery of the heat retained by the as-produced slag ballast by forced cooling thereof is taken into consideration, there is no sense in continuing to cool the already solidified slag in the revolving cylindrical body, but rather it is more advantageous to discharge the broken slag ballast out of the revolving cylindrical body as soon as possible. According to the present invention, this is possible. In the present invention, the broken up slag is quickly discharged out of the revolving cylindrical body while it is still hot, introduced into a heat exchange tower, and then gas such as cold air or cold nitrogen is introduced into the heat exchange tower to cause the slag ballast heat to be absorbed by the gas, so that as the result, the hot slag ballast is cooled, and its heat is effectively recovered.

Now, an example of the device for actually performing the method of the present invention will described in connection with FIGS. 2 and 3.

The top surface 2 of the base 1 supporting the revolving cylindrical body 5 is slightly inclined in the forward direction (left in FIG. 2) with respect to the ground line L. On the top surface 2 of the base 1, two sets of rollers 3 are disposed, spaced at a proper distance in the longitudinal direction of the base 1, each of said two sets consisting of two rollers spaced at a proper distance in the width direction of the base 1 (perpendicular to the paper surface of FIG. 2). All these rollers 3 are freely rotatable around their respective axes 4 that are parallel to the longitudinal direction of the base 1.

The revolving cylindrical body 5 is mounted on the base with the peripheral surface being supported by the rollers 3. The upper end 6 of the revolving cylindrical body 5 serves as the inlet for molten slag, and the end of the trough 8 for pouring molten slag into said revolving cylindrical body 5 is extended into this inlet. On the other hand, the lower end 7 of the revolving cylindrical body 5 is connected to the upper portion of the heat exchange tower 16 described hereinafter.

Near the lower end 7 of the cylindrical revolving body 5, a ring gear 9 is securely attached around its circumference, and this ring gear 9 is in engagement with a gear 10 supported on the base 1 and driven by a motor 11.

Above the revolving cylindrical body 5, extending along its length, is a water sprinkling pipe 12 having a plurality of sprinkling nozzles 13 directed towards the top surface of the revolving cylindrical body 5. This sprinkling pipe 12 receives cooling water from the water supply pipe 14. At the forward end of the base 1 is disposed a water collecting means 15 for recovering water dripping from the revolving cylindrical body 5 and flowing along the top surface 2 of the base 1.

The heat exchange tower 16 for recovering heat from the slag ballast comprises a storage bin 17 and a heat exchange chamber 20, and is disposed with its axis directed vertically.

Into the upper portion of the storage bin 17, the lower end 7 of the revolving cylindrical body 5 is introduced, and at the lower end of the storage bin 17, a gate apparatus 19 is arranged.

Into the upper portion 21 of the heat exchange chamber 20, the lower end 18 of the storage bin 17 is inserted, and in the lower portion 22 of the heat exchange chamber 20, a cold air blowing device 23 having an upward directed blowing opening 24 is installed. Immediately above this blowing opening 24 is positioned a bell 25 for preventing ballast from entering the blowing opening 24. Furthermore, around the lower portion 22 of the heat exchange chamber 20 is an encircling annular air duct 26, which is connected with said cold air blowing device 23. This air duct is also connected to the blower 29 through a cold air duct 27 having a damper 28 near its middle point.

Furthermore, near the upper portion 21 of the heat exchange chamber 20, the end of the hot air extraction pipe 30 is inserted into the interior of the chamber 20, and at the lower end 31 of the lower portion 21 of the heat exchange chamber 20, a gate apparatus 32 is installed. Directly below the gate apparatus 32, there is provided a conveyor 33 for transporting the produced ballast away.

In the operation of the slag ballast production device having the foregoing construction, the pouring rate of molten slag and some additives into the revolving cylindrical body, the sprinkling rate of cooling water and other auxiliary cooling media sprinkled over the external peripheral surface (cooling surface) of the revolving cylindrical body 5, the size (diameter and length) and other supplementary features of the revolving cylindrical body 5, the rotating speed of the revolving cylindrical body 5, the angle of inclination of the revolving cylindrical body 5, and other features are all calculated and determined in such a way that the requirements for factors such as the hourly production rate of ballast, the cooling rate of the molten slag before solidification in the revolving cylindrical body 5 that assures the production of good slag ballast as described earlier (over 20° C/min.), and preferably, the filling ratio of slag within the revolving cylindrical body 5 that assures satisfactory breaking up of slag in the succeeding process to be described later (over 10%) are all satisfactorily met. In addition to these factors, the flow rate of the cold air supplied to the heat exchange tower 16 is determined depending on the ballast temperature, hourly production rate of the ballast, and the required temperature of the extracted hot air.

Now, an example of the operation sequence of the example device described above performing the production method of the present invention, and the sequence of reactions taking place in that device will be described below.

First, molten slag produced in a blast furnace is poured at a temperature above 1300° C into the revolving cylindrical body 5 at a predetermined flow rate through the upper end opening 6 by means of the trough 6. When this is started, the revolving cylindrical body 5 is already rotating around its axis being driven by the motor 11 through the gear 10 and the ring gear 11. The whole outside peripheral surface (cooling surface) of the revolving cylindrical body 5 is already receiving cooling water being sprinkled at a predetermined rate from the sprinkling pipe 12. Then, the poured molten slag is cooled in the revolving cylindrical body 5, solidifies, and adheres to the internal wall of the revolving cylindrical body 5. The adhering slag is lifted in the direction of the revolution of the revolving cylindrical body 5, as the latter keeps on revolving. When the slag is lifted to a certain height, the vertical component of the gravity working on the slag becomes larger than the sum of the adhesive force holding the slag adhered to the wall and the deflective strength of the solidifying slag, and the slag drops by its own weight. When it drops, not only is the slag further broken but also, because it drops vertically, it drops onto a point slightly shifted from the position before rising towards the lower end 7 of the revolving cylindrical body, because of the inclination of the latter. Afterwards, the broken slag is again lifted, to some extent by the revolving cylindrical body 5, and again drops, and so forth, and by this repeated rising and dropping, not only is it further broken up, but also, because the revolving cylindrical body 5 is inclined, it is gradually moved towards the lower end 7 of the revolving cylindrical body 5, and at last, it is discharged from the latter out of the lower end 7 into the heat exchange tower 16.

During this time, the cooling water sprinkled by the water sprinkling pipe 12 over the external surface (cooling surface) of the revolving cylindrical body 5 drips onto the base 1 and flows into the water collecting means 15 at the lower end thereof. The collected water may be returned to the water supply source (not shown) supplying water to the sprinkling pipe 12.

In this way, the slag broken into small lumps at a temperature between 1000° and 1100° C (melting point of slag is 1250° to 1260° C) is discharged from the revolving cylindrical body 5 out of the lower end, and enters the heat exchange tower 16 immediately. The storage bin 17 is designed to improve the cooling efficiency of the slag ballast in the heat exchange chamber 20, and consequently, to improve the heat recovery efficiency.

The chief reason for dividing the heat exchange tower into the upper and the lower portions is as follows. Generally, in order to obtain maximum cooling and heat recovering efficiency, the cooling (heat recovery) operation should be performed continuously, and also for achieving maximum utilization of the recovered heat, the cooling (heat recovery) operation should be performed continuously. However, because slag is discharged from a blast furnace only intermittently, continuous cooling is impossible without providing some means for changing the intermittent flow to continuous flow. The storage bin 17 is designed to store lumpy slag ballast, and to supply the stored slag ballast continuously to the heat exchange chamber 20 to enable a continuous cooling (heat recovery) operation to be conducted therein.

As described earlier, the slag ballast discharged from the revolving cylindrical body 5 out of its lower end 7, and packed in the storage bin 17 is allowed to fall into the heat exchange chamber 20 through the gate apparatus 19. Then, when the slag ballast becomes packed to a predetermined height, the cold air blowing device 23 starts to blow cold air into the heat exchange chamber 20. The cold air introduced into the heat exchange chamber 20 makes contact with the lumpy slag ballast, extracts heat from the latter, rises through the latter, and finally, is discharged through the hot air extraction pipe 30 provided in the upper part of the heat exchange chamber 20.

On the other hand, the slag ballast is cooled through the heat exchange with the cold air, becomes cold, and is discharged through the gate apparatus 32 provided at the lower end of the heat exchange chamber 20, and finally is transported to its destination by means of the conveyor 33. When this process is taking place, the hot lumpy slag ballast is supplied from the storage bin 17 to the heat exchange chamber 20. In this way, lumpy slag ballast is more or less continuously cooled, and as the result, heat is recovered more or less continuously from it.

Now the present invention will be further described by the following nonlimitative examples.

EXAMPLE 1

Figures 2, 3:
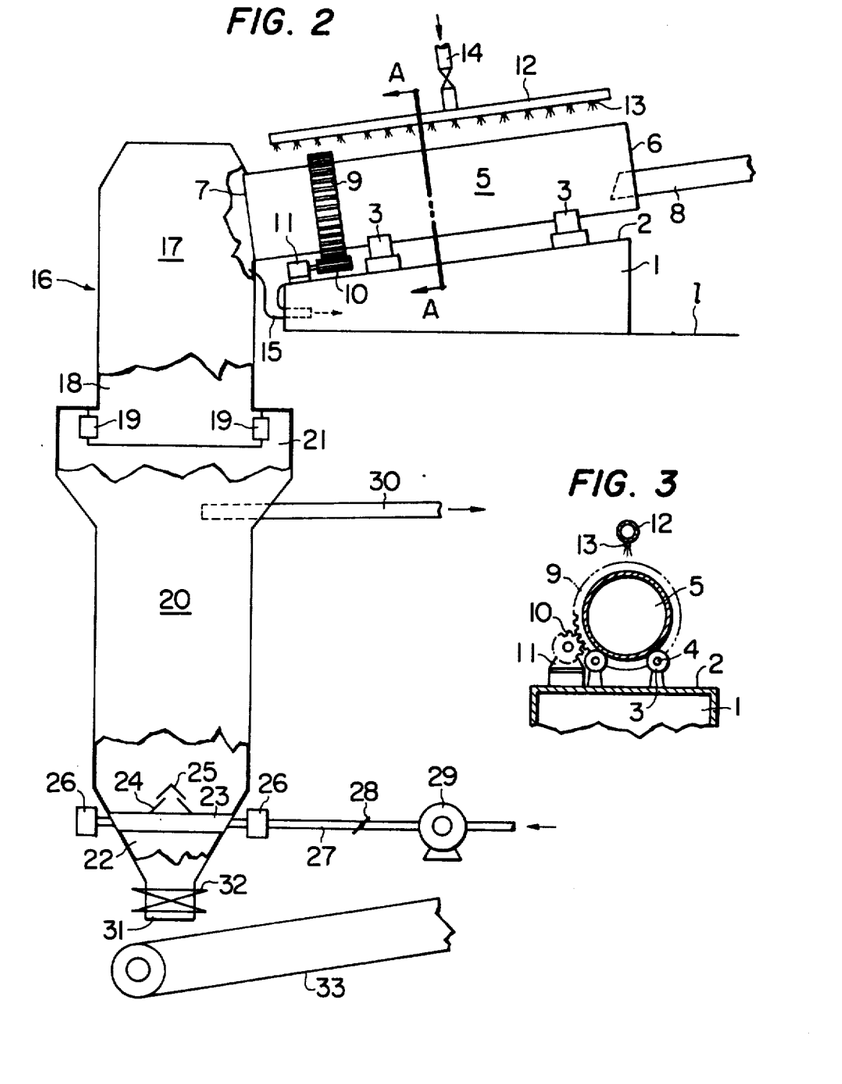
FIG. 2 is a schematic elevation view of one embodiment of the apparatus for carrying out the method of the present invention.
FIG. 3 is a sectional view taken along the line A—A of FIG. 2.

A pilot plant as shown in FIGS. 2 and 3 was used to produce slag ballast, and the following operating conditions as shown in Table 1 were used.

Table 1

| Operating conditions | 1 | 2 | 3 |
|---|---|---|---|
| Composition of molten blast furnace | | | |
| T . Fe (%) | 0.11 | 0.46 | 0.12 |
| CaO (%) | 42.4 | 41.2 | 40.2 |
| $SiO_2$ (%) | 31.9 | 31.9 | 33.0 |
| $Al_2O_3$ (%) | 15.9 | 15.6 | 16.0 |
| MgO (%) | 5.3 | 5.8 | 6.0 |
| S (%) | 1.28 | 1.22 | 1.26 |
| others (%) | 3.11 | 3.82 | 3.42 |
| Basicity (—) | 1.33 | 1.29 | 1.22 |
| Pour rate of molten slat (t/h) | 2.0 | 4.5 | 8.5 |
| Pouring temperature of molten slag (° C) | 1,390 | 1,410 | 1,400 |
| Flow rate of sprinkled cooling water (t/h) | 18 | 18 | 13.5 |
| Temperature of sprinkled water before sprinkling (° C) | 17 | 18 | 15 |
| Temperature of sprinkled water cooling, max (° C) | 61 | 63 | 67 |
| Length of revolving cylindrical body (m) | 4.0 | 4.0 | 4.0 |
| ID of revolving cylindrical body (m) | 0.65 | 0.65 | 0.65 |
| Wall thickness of revolving cylindrical body (m) | 0.0125 | 0.0125 | 0.0125 |
| Material of revolving cylindrical body | SS41 | SS41 | SS41 |
| Revolving speed of revolving cylindrical body (rpm) | 2.5 | 2.5 | 2.5 |
| Inclination of revolving cylindrical body (degree) | 6 | 8 | 8 |
| Filling ratio of molten slag in revolving cylindrical body (%) | 15 – 20 | 30 | 40 – 50 |
| Mean temperature of discharged slag (° C) | 890 | 1060 | 1210 |
| Stay time in revolving cylindrical body (min) | 2.5 | 4.2 | 6.5 |
| Mean cooling rate of slat in revolving cylindrical body (° C/min) | 200 | 83.3 | 29.2 |

The grain size distributions of the slag ballast obtained through the above operations are as shown in Table 2.

Table 2

| | Case | | |
|---|---|---|---|
| Grain size distribution | 1 | 2 | 3 |
| up to 10 mm (weight %) | 5 | 8 | 10 |
| 10 – 25 mm (weight %) | 10 | 20 | 20 |
| 25 – 50 mm (weight %) | 25 | 30 | 35 |
| 50 – 150 mm (weight %) | 45 | 30 | 30 |
| 150 – 200 mm (weight %) | 10 | 7 | 5 |
| 200 mm and above (weight %) | 5 | 5 | 0 |

In Table 3, the properties of the slag ballast obtained by the foregoing operations are compared with those of a conventional slag ballast.

Table 3

| Properties | Case 1 | 2 | 3 | Conventional ballast |
|---|---|---|---|---|
| Sp. gravity of fine aggregate (g/cm³) | 2.59 | 2.60 | 2.51 | 2.5 |
| Water absorption ratio of fine aggregate (%) | 2.72 | 2.80 | 3.52 | 4.0 |
| Sp. gravity of coarse aggregate (g/cm³) | 2.59 | 2.43 | 2.50 | 2.4 |
| Water absorption ratio of coarse aggregate (%) | 2.55 | 3.80 | 4.52 | 5.0 |
| Bulk density, light burden (t/m³) | 1.5 | 1.43 | 1.3 | 1.45 |
| Bulk density, heavy burden (t/m³) | 1.7 | 1.62 | 1.4 | 16 |
| Max. dry density (g/cm³) | 2.234 | 2.06 | 1.94 | 2.1 |
| Optimum water content (%) | 9 | 8.1 | 8.0 | 9 |
| Performance factor (Bulk density/sq. gravity) (%) | 66 | 65 | 56 | 60 – 65 |
| $S^{2-}$ concentration (cold water extraction) (ppm) | 2.5 | 3.0 | 3.4 | 12 |

EXAMPLE 2

Slag ballast was cooled under the operation conditions given in Table 4 with the use of a device as shown in FIG. 2.

Table 4

| Operation conditions | 1' | 2' | 3' |
|---|---|---|---|
| Slag ballast discharged from revolving cylindrical body (Temperature of slag ballast) | Same as 1 in Table 1 | Same as 2 in Table 1 | Same as 3 in Table 1 |
| | 890° C | 1,060° C | 1,210° C |
| (Grain size of slag ballast) | Same as 1 in Table 1 | Same as 2 in Table 1 | Same as 3 in Table 1 |
| Mean temperature of slag ballast as introduced into heat exchange chamber | 890° C | 1,060° C | 1,210° C |
| Quantity of cooled slag ballast per hour in heat exchange chamber | 2 t/h | 4.5 t/h | 8.5 t/h |
| Cold air blow rate into heat exchange chamber | 2100 Nm³/h | 4300 Nm³/h | 6000 Nm³/h |
| Temperature of cold air blown into heat exchange chamber | 25° C | 25° C | 25° C |
| Pressure of cold air blown into heat exchange chamber | 1100 mmAq | 1000 mmAq | 800 mmAq |

The results of the operations of the above examples are as given in Table 5.

Table 5

| | Case | | |
|---|---|---|---|
| | 1' | 2' | 3' |
| Time required by forced cooling in heat exchange chamber | 43 min. | 55 min. | 63 min. |
| Temperature of slag ballast discharged from heat exchange chamber | 200° C | 250° C | 200° C |
| Temperature (max.) of hot air extracted from hot air extraction pipe | 700° C | 800° C | 850° C |

The properties of the slag ballast after the above cooling operations were same as the properties of the same ballast after the operations in Example 1 (see Table 3) for cases 1, 2 and 3.

EXAMPLE 3

Molten blast furnace slag was introduced into a revolving cylindrical body as shown in FIG. 2 together with rolling scale, and slag ballast was produced. Rolling scale was introduced at a rate of 10 kg for every ton of molten blast furnace slag.

EXAMPLE 4

Iron oxide powder ($Fe_2O_3$) recovered from acid waste was introduced into a revolving cylindrical body as shown in FIG. 2 together with molten blast furnace slag and slag ballast was produced. The iron oxide ($Fe_2O_3$) recovered from acid waste was introduced at a rate of 1.25 of the blast furnace molten slag.

EXAMPLE 5

Molten blast furnace slag and converter slag, in the form of powder having a 0.2 to 3 mm grain size, were together introduced into a revolving cylindrical body as shown in FIG. 2 and slag ballast was produced. The converter slag was introduced at a rate of 4% (weight) of the molten slag.

COMPARATIVE EXAMPLE 1

Molten blast furnace slag without any additive was processed in the revolving cylindrical body of a device as shown in FIG. 2 to obtain slag ballast.

The operating conditions of the above examples and Comparative Example 1 were as shown in Table 6 below.

Table 6

| Operation conditions | Ex. 3 | Ex. 4 | Ex. 5 | Comparative Ex. 1 |
|---|---|---|---|---|
| Temperature of molten slag as poured into revolving cylindrical body (° C) | 1380 | 1310 | 1300 | 1285 |
| Pouring rate of molten slag into revolving cylindrical body (t/h) | 60 | same as left | same as left | same as left |
| Flow rate of sprinkling water (t/h) | 320 | " | " | " |
| Length of revolving cylindrical body (m) | 20 | " | " | " |
| ID of revolving cylindrical body (m) | 2 | " | " | " |
| Wall thickness of revolving cylindrical body (m/m) | 12 | " | " | " |
| Material of revolving cylindrical body | SS41 | " | " | " |
| Revolving speed of revolving cylindrical body (rpm) | 1.0 | " | " | " |
| Inclination of revolving cylindrical body (degree) | 6 | " | " | " |
| Filling rato of slag in revolving cylindrical body (%) | 25–30 | " | " | — |

The grain size distributions of the slag ballast obtained in the above examples are shown in Table 7 below.

Table 7

| Grain size distribution | Ex. 3 | Ex. 4 | Ex. 5 | Comparative Ex. 1 |
|---|---|---|---|---|
| below 10 mm (weight %) | 23.5 | 26.2 | 34.8 | Due to ring formation, operation was impossible. |
| 10 – 40 mm (weight %) | 39.6 | 51.8 | 39.7 | |
| 40 – 80 mm (weight %) | 20.2 | 16.8 | 14.5 | |
| over 80 mm (weight %) | 16.7 | 5.2 | 11 | |

The temperature of slag ballast as discharged from the revolving cylindrical body was 1080° C in Example 3, 1020° C in Example 4, and 975° C in Example 5.

The properties of the slag ballast obtained in the above examples and comparative example are compared with those of conventional ballast obtained through a conventional process in Table 8 below.

Table 8

| | Ex. 3 | Ex. 4 | Ex. 5 | Conventional ballast |
|---|---|---|---|---|
| Sp. of gravity of fine aggregate (g/cm³) | 2.62 | 2.54 | 2.76 | 2.5 |
| Water absorption ratio of fine aggregate (%) | 1.8 | 1.9 | 1.2 | 4.0 |
| Bulk density (t/m³) | 1.68 | 1.59 | 1.79 | 1.6 |
| Max. dry density (g/cm³) | 2.13 | — | 2.18 | 2.1 |
| Optimum water content (%) | 5.9 | — | 6.1 | 9.0 |
| Performance factor (Bulk density/sp. gravity) (%) | 64 | — | 65 | 60 |
| $S^{2-}$ concentration (cold water extraction) (ppm) | — | 2.0 | 2.5 | 12 |
| Uniaxial compressive strength (kg/cm²) | 32.4 | 27.5 | 34.8 | 23.2 |

As can be clearly understood from the foregoing description, according to the present invention, molten blast furnace slag is poured into a revolving cylindrical body the whole external peripheral surface of which is utilized as the cooling surface, and the cooling rate of the blast furnace molten slag in the revolving cylindrical body before its solidification is controlled so as to be at a rate over 20° C/min, so that the molten slag is cooled, solidifies, and is broken up into slag ballast in one process, and furthermore, the obtained slag ballast is not only comparable with conventional slag ballast produced through conventional processes, but also superior with respect to the soluble sulfur content. In the production process based on the present invention, vast cooling yards required in conventional processes are not required at all, the manpower required in conventional processes in crushing solidified slag is unnecessary, and furthermore, when the slag filling ratio in the revolving cylindrical body 5 is preferably adjusted so as to be at a level above 10%, more and more smaller grains are obtained in the ballast, as shown in Table 2, so that it is easier to further crush the slag ballast in a succeeding crushing operation. Furthermore, because the cylindrical body 5 is kept in rotation, and its external surface is coated with a layer of cooling water, the revolving cylindrical body 5 is prevented from undergoing an excessive temperature rise despite its constant contact with molten slag. Therefore, not only is it easy to maintain the cooling rate of the molten slag inside the revolving cylindrical body before solidification so that it is at a rate over 20° C, but also, the revolving cylindrical body 5 is protected from excessive thermal stress, resulting in a long service life. Furthermore, because the cross sectional shape of the revolving cylindrical body 5 is a true circle or approximately so, with a proper adjustment of the flow rate of the cooling water delivered by the sprinkling pipe 12, the whole external peripheral surface (cooling surface) of the revolving cylindrical body 5 is coated with a water layer of uniform thickness, so that as the rotating cylindrical body 5 keeps on revolving, the slag in the cylindrical body 5 is cooled at a uniform rate, resulting in a high rate of uniformity in the properties of the thus obtained slag ballast. On the other hand, when the whole external peripheral surface of the revolving cylindrical body 5 is not uniformly covered with a water film of uniform thickness, as may result when a large amount of cooling water must be poured in order, for example, to obtain a high cooling rate, additional water sprinkling pipes may be arranged at positions where the water film is likely to become thin or not to be present mostly at the lower portion of the revolving cylindrical body 5.

Furthermore, when powder materials as described earlier are introduced into the revolving cylindrical body together with molten slag, slag ballast is obtained in small lumps as shown in Table 7.

In the comparative example shown in Table 7, a ring of slag was formed inside the revolving cylindrical body. Also, as shown in Table 8, in Example 3, slag ballast of higher uniaxial compressive strength was obtained, in Example 4, lower $S^{2-}$ ion concentration was obtained, and in Example 5, not only was the uniaxial compressive strength improved, but also the $S^{2-}$ ion concentration was reduced.

Furthermore, because in the production process according to the present invention, the cooling rate of the molten slag in the revolving cylindrical body before its solidification is maintained at a level above 20° C/min to obtain hot slag ballast in proper size lumps, and the obtained slag ballast is immediately cooled by forced air flow, the present invention offers in addition to the above enumerated advantages another advantage, namely that comparatively cool slag ballast is obtained in a comparatively short time. Still further in addition to this advantage, because forced cooling of the still hot slag ballast can be carried out, the present invention has the further advantage that the heat contained in the hot slag ballast can be effectively recovered for further utilization.

Although the device for carrying out the method of the present invention as shown in FIGS. 2 and 3 is equipped with a trough 8 to pour molten blast furnace slag into the revolving cylindrical body 5, it should be understood that instead of this trough 8, any suitable means such as a receptacle pan can be used. Also, when a trough 8 is used, this trough 8 may be extended to the blast furnace so as to make it possible to allow the blast furnace molten slag to flow directly from the blast furnace to the revolving cylindrical body 5, or else an arrangement is also possible in which the molten slag produced in a blast furnace is received in a slag ladle, and this slag ladle is utilized to pour the molten slag into the revolving cylindrical body 5 through the trough 8. It should also be understood that when powder materials are to be introduced into the revolving cylindrical body together with molten slag, although no specific means therefor is illustrated, any known means may be employed. Instead of the water sprinkling pipe 12, a water jacket may be employed to cool the molten slag in the revolving cylindrical body 5, as long as the cooling rate of the slag before solidification is kept at a level above 20° C/min. All members such as the motor 11 which have poor water resistance, are preferably protected by a proper water protection cover. Instead of the pair of gears 9 and 10 used to drive the revolving cylindrical body 5 in the foregoing embodiment, any other suitable drive means such as a chain drive mechanism may be employed, and when heat recovery is not required, said heat exchange tower 16 may be eliminated, and a ballast transporting conveyor may be installed directly underneath the lower end 7 of the revolving cylindrical body 5.

Finally, it should also be pointed out that although in the examples of the production process based on the present invention as described above, only blast furnace molten slag was used as the material, the present invention is just as effectively applied to other slags such as open hearth furnace slag, converter slag, and electric furnace slag.

What is claimed is:

1. A method of producing slag ballast having a low $S^{2-}$ ion concentration by cooling molten slag containing a high proportion of sulfur and which is obtained in metal smelting processes, which method comprises:
   a. introducing molten slag into the upper end of an inclined revolving cylindrical body having an external peripheral cooling surface;
   b. cooling the said external peripheral surface for cooling the slag at a cooling rate in excess of 20° C/min. until solidification of the slag takes place for reducing the $S^{2-}$ ion concentration of the cooled slag to a level not exceeding 5 ppm;
   c. moving the solidified slag forward and tumbling the slag in the revolving cylindrical body as it is being cooled for crushing the slag; and
   d. discharging the cooled, broken and lumpy slag from the revolving cylindrical body through the lower end thereof.

2. A method according to claim 1 wherein said cooling is accomplished by sprinkling water over the external peripheral surface of said revolving cylindrical body.

3. A method according to claim 1 wherein the molten slag is introduced into the revolving cylindrical body at a filling ration which is at least 10%.

4. A method according to claim 1 wherein said revolving cylindrical body is inclined at an angle between 2° and 10°.

5. A method according to claim 1 wherein the molten slag is introduced into the revolving cylindrical body together with at least one additive in powder form for fixing the sulfur contained in the slag and preventing sulfur from dissolving when water contacts the thus produced slag ballast.

6. A method according to claim 5 wherein the additive is a member taken from the group consisting of mixing converter slag, steel rolling scale, Indian ferromanganese ore, and blast furnace slag ballast in powder form.

7. A method according to claim 1 further comprising introducing the lumpy slag ballast discharged from said revolving cylindrical body immediately into a heat exchange tower, and cooling the lumpy slag ballast by blowing gas into the heat exhange tower in a forced flow from the lower end of the tower.

8. A method according to claim 7 wherein the high temperature gas produced by said forced flow of gas is recovered for further utilization.

* * * * *